(12) United States Patent
Wissel et al.

(10) Patent No.: US 11,287,288 B2
(45) Date of Patent: Mar. 29, 2022

(54) POSITION DETECTION SYSTEM AND METHOD FOR DETECTING A MOVEMENT OF A MACHINE

(71) Applicant: Robert Bosch GmbH, Stuttgart (DE)

(72) Inventors: Felix Wissel, Karlstein am Main (DE); Gerhard Bund, Lohr-Rodenbach (DE)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 16/567,032

(22) Filed: Sep. 11, 2019

(65) Prior Publication Data
US 2020/0088551 A1 Mar. 19, 2020

(30) Foreign Application Priority Data
Sep. 18, 2018 (DE) ..................... 10 2018 215 796.0

(51) Int. Cl.
*G01D 5/245* (2006.01)
*G01D 5/244* (2006.01)
*G01D 5/14* (2006.01)

(52) U.S. Cl.
CPC ........... *G01D 5/2451* (2013.01); *G01D 5/142* (2013.01); *G01D 5/24457* (2013.01)

(58) Field of Classification Search
CPC .......... G01D 5/14; G01D 5/142; G01D 5/145; G01D 5/24457; G01D 5/2451
See application file for complete search history.

(56) References Cited

U.S. PATENT DOCUMENTS

| | | | | |
|---|---|---|---|---|
| 5,757,180 A | * | 5/1998 | Chou ..................... | G01D 5/145 324/207.2 |
| 6,498,409 B1 | * | 12/2002 | Collier-Hallman .... | G01D 5/145 310/68 B |
| 2010/0050731 A1 | * | 3/2010 | Granig .................... | G01P 21/02 73/1.11 |
| 2017/0322014 A1 | | 11/2017 | Jeon et al. | |
| 2018/0231399 A1 | * | 8/2018 | Okumura ............. | G01D 5/2451 |
| 2018/0231400 A1 | | 8/2018 | Okumura et al. | |
| 2018/0231401 A1 | * | 8/2018 | Okumura ............. | G01D 5/2449 |
| 2018/0231402 A1 | * | 8/2018 | Okumura ........... | G01D 5/24476 |

FOREIGN PATENT DOCUMENTS

DE 44 40 214 A1 5/1996

OTHER PUBLICATIONS

UK search report corresponding to UK Patent Application No. GB1913253.9, dated Mar. 10, 2020 (3 pages).

* cited by examiner

*Primary Examiner* — Steven L Yeninas
(74) *Attorney, Agent, or Firm* — Maginot, Moore & Beck LLP

(57) ABSTRACT

The disclosure provides a position detection system and a method for detecting a movement of a machine. The position detection system comprises a first position sensor configured to detect a magnetic field that forms magnet pole pairs arranged in a row, magnet poles of different polarity being arranged next to one another in each case, a second position sensor configured to detect a magnetic field at an individual magnet arranged in a center of the magnet pole pairs and at a distance from each magnet pole; and an evaluation device configured to evaluate detection results of the first and second position sensors that have been detected based on a movement of an element of the machine relative to the first and second position sensors, the evaluation including identifying a fault based on the detection results of the first and second position sensors.

11 Claims, 4 Drawing Sheets

POSITION DETECTION SYSTEM AND METHOD FOR DETECTING A MOVEMENT OF A MACHINE

This application claims priority under 35 U.S.C. § 119 to application no. DE 10 2018 215 796.0, filed on Sep. 18, 2018 in Germany, the disclosure of which is incorporated herein by reference in its entirety.

TECHNICAL FIELD

The present disclosure relates to a position detection system and to a method for detecting a movement of a machine, for example a rotating machine, in particular in the non-operating state of said machine.

BACKGROUND

Machines, such as electrical machines, motors, generators, rotating machines, linear machines etc. for example, are used in many fields of engineering in order to set objects in motion, for example, to generate electrical energy etc. Depending on the application, during operation of the machine and/or for starting up the machine, it is important to know which position the machine is in, in order to be able to execute a defined movement with the aid of the machine during operation.

In the case of machines, the axle(s) or shaft(s) of said machines may be moved in the switched-off state of the machine, for example in the event of cleaning of the machine. As a result, when the machine is switched on, the shaft and/or the machine parts which are coupled to said shaft are in an undefined position.

In some applications, the machine is installed in an arbitrary application. The application with the machine installed therein is then passed to the user. During transportation, the shaft of a rotating machine, for example, may be rotated. As a result, the shaft of the rotating machine is in an undefined position when the application is started up.

Therefore, it is necessary to re-initialize the position of the shaft of the rotating machine or the position of the machine parts which are coupled to said shaft when starting up the application.

Depending on the application, this means a large amount of expenditure. As a result of this, the time required for start-up is extended, this resulting in the costs of start-up and therefore of the application being increased.

SUMMARY

The object of the present disclosure is therefore to provide a position detection system and a method for detecting a movement of a machine, with which position detection system and method the abovementioned problems can be solved. A particular aim is to provide a position detection system and a method for detecting a movement of a machine over several machine revolutions in the non-operating state of said machine, with which position detection system and method uncomplicated and cost-effective start-up of the rotating machine can be implemented.

This object is achieved by a position detection system for detecting a movement of a machine according to the disclosure. The position detection system comprises a first position sensor for detecting a magnetic field which forms at a large number of magnet pole pairs which are arranged in a row, wherein magnet poles of different polarity are arranged next to one another in each case, a second position sensor for detecting a magnetic field at an individual magnet which is arranged in a center of the large number of magnet pole pairs which are arranged in a row and is arranged at a distance from the large number of magnet pole pairs which are arranged in a row, and an evaluation device for evaluating at least one detection result of the first position sensor and at least one detection result of the second position sensor which has been detected on the basis of a movement of an element of the machine relative to the position sensors, wherein the evaluation device is configured to use the at least one detection result of the first position sensor and the at least one detection result of the second position sensor for fault identification in an evaluation of the detection results of the position sensors.

The position detection system is a very compact magnetic detection system which, by way of redundancies and self-tests, greatly reduces the probability of a fault and therefore achieves a high level of security. In this case, the position detection system is very robust to mechanical loads and environmental influences. The position detection system is also space-saving and expedient in respect of manufacture.

Owing to the construction of the position detection system, the number of detectable revolutions does not have an upper limit. In addition, the position detection system is configured in such a way that a fully reproducible behavior of the system can be achieved.

The position detection system provides the major advantage that the position of the shaft of the machine and/or the position of a rotor of the machine can always be detected with a high level of security. In this case, two sensors, which detect a movement of the shaft of the machine or the position of a rotor of the machine, provide not only a secure incremental position but rather also a secure absolute position. In this case, the associated redundancy, which is required for forming the secure incremental position, can be used for fault identification in the secure absolute position.

The position detection system can be configured in such a way that the position can be detected in a simple and secure manner in the non-operating state too. As a result, the actual position of the rotor of the machine is always known even if the machine is moved, for example, in the non-operating state, in particular in the event of cleaning, or has been transported from a first location to a second location and in the process the shaft of the machine has rotated etc. As a consequence of this, an initialization movement during start-up of the machine can be dispensed with.

The position detection system is configured for particularly efficient utilization of energy in such a way that the position detection system becomes active only when the shaft or the rotor of the machine is actually rotating. If rotation or movement is no longer taking place, the position detection system becomes inactive again. Therefore, a position detection system of this kind has a passive manner of functioning. The position detection system operates in a highly energy-saving manner since detection of the absolute position within several revolutions is possible with an energy buffer, without a permanent power supply.

A further advantage of the position detection system is its high degree of reliability. As a result, the position detection system can be used, in particular, for rotating machines in which secure determination of the position is required.

Advantageous further refinements of the position detection system are specified in the embodiments.

The above-described position detection system can additionally have an electronic circuit and at least one switch, wherein the electronic circuit is configured to output a signal for actuating the at least one switch in response to the reception of a signal from the first or second position sensor that a change in a magnetic field has been detected, and wherein the at least one switch is configured to switch on or switch off the detection by the other of the first or second position sensor in response to the signal which is output by the electronic circuit.

The evaluation device possibly has a first control unit for evaluating the detection results of the first position sensor and a second control unit for evaluating the detection results of the second position sensor. In addition or as an alternative, the first position sensor has is configured for detecting an incremental position in a movement of an element of the machine. In addition or as an alternative, the second position sensor has is configured for detecting the absolute position in a movement of an element of the machine and for direction identification of the movement of the element of the machine.

The evaluation device can be configured for evaluating the absolute position within a plurality of revolutions of the element of the machine.

The position detection system possibly additionally has an energy supply device for supplying the first position sensor, the electronic circuit, the at least one switch and the second control unit with electrical energy.

It is conceivable for the first position sensor and the second position sensor to each be a TMR sensor, or for the first position sensor to be a TMR sensor and the second position sensor to be a parameterizable Hall sensor.

The electronic circuit can have a flip-flop circuit.

At least one above-described position detection system can be part of a machine which additionally has at least one movable element which can be driven to perform a rotational movement by the machine, wherein the at least one position detection system is provided for detecting a movement of the at least one movable element, in particular in the non-operating state of the machine. In this case, the at least one element of the machine is the rotor or the shaft of the machine.

At least one above-described position detection system can be part of an installation which additionally has at least one installation element which is to be driven and at least one machine for driving the at least one installation element which is to be driven to perform a rotational movement or a linear movement. In this case, the at least one position detection system is provided or configured for detecting a movement of at least one element of a machine in the non-operating state of said machine.

The object is additionally achieved by a method for detecting a movement of a machine comprising a position detection system according to the disclosure. The position detection system has a first position sensor, a second position sensor and an evaluation device, wherein the method comprises the steps of detecting, by way of the first position sensor, a magnetic field which forms at a large number of magnet pole pairs which are arranged in a row, wherein magnet poles of different polarity are arranged next to one another in each case, detecting, by way of a second position sensor, a magnetic field at an individual magnet which is arranged in a center of the large number of magnet pole pairs which are arranged in a row and is arranged at a distance from the large number of magnet pole pairs which are arranged in a row, and evaluating, by way of the evaluation device, at least one detection result of the first position sensor and at least one detection result of the second position sensor which has been detected on the basis of a movement of an element of the machine relative to the position sensors, wherein the evaluation device uses the at least one detection result of the first position sensor and the at least one detection result of the second position sensor for fault identification in an evaluation of the detection results of the position sensors.

The method achieves the same advantages as are mentioned above with respect to the position detection system.

Further possible implementations of the disclosure also comprise combinations, not explicitly mentioned, of features or embodiments described above or below with respect to the exemplary embodiment. In this case, a person skilled in the art will also add individual aspects as improvements or additions to the respective basic form of the disclosed subject matter.

BRIEF DESCRIPTION OF THE DRAWINGS

The disclosure is described in more detail below using exemplary embodiments and with reference to the appended drawings, in which.

DETAILED DESCRIPTION

In the figures, elements which are the same or have the same function are provided with the same reference symbols, unless stated otherwise.

Figure 1:
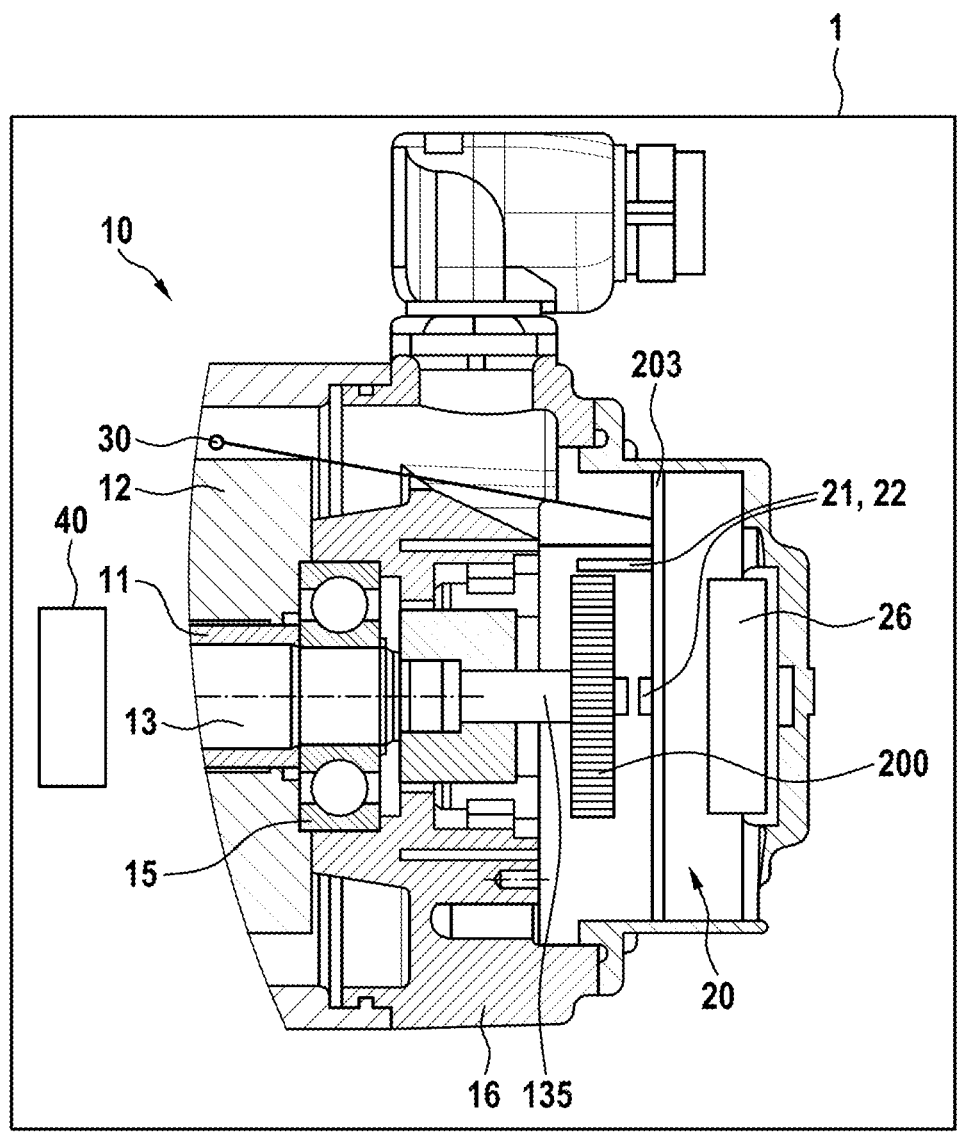
FIG. 1 shows a schematic view of an installation comprising a machine which is illustrated in a partially sectioned view and onto which a position detection system according to a first exemplary embodiment is mounted.

FIG. 1 shows an installation 1 comprising a machine 10, a position detection system 20, a winding temperature sensor 30 and an installation element 40 which can be moved by the machine 10.

The installation 1 can be or have a transportation device for transporting an object, such as, for example, a robot which has more than one machine 10, a conveyor belt on which a rotating machine and/or a linear machine is used etc. In particular, the installation 1 is or has a movement apparatus for moving a workpiece and/or a tool for processing the workpiece, wherein the movement apparatus uses or has the machine 10. As an alternative, the installation 1 can be or have a mixing plant. As a further alternative, the installation 1 can be or have a centrifuge. Any desired other application options are conceivable for the installation 1.

If appropriate magnetic fields are generated in the machine 10, a rotor 11 can be rotated relative to a stator 12 about a machine axis or shaft 13 on which the rotor 11 is mounted. The shaft 13 is rotatably mounted by bearings 15 on a housing 16 of the machine 10. The temperature of coil windings of the stator 12 can be detected by the winding temperature sensor 30.

The position detection system 20 is provided and arranged on the machine 10 of FIG. 1 for detecting the rotation of the shaft 13 and therefore also of the rotor 11. To this end, the position detection system 20 has two position sensors 21, 22 which can identify the movement of magnets on a pole wheel 200. The pole wheel 200 is mechanically coupled to the shaft 13 in a manner fixed to a magnetic decoupling unit 135. The magnetic decoupling unit 135 is produced from non-ferromagnetic material. As a result, the decoupling unit 135 causes magnetic decoupling even if there is mechanical coupling to the shaft 13. The position sensors 21, 22 are mounted on an electronics assembly 203 of the position detection system 20. In addition to the functions described below, the electronics assembly 203 is further configured for processing the detection results of the winding temperature sensor 30.

The machine 10 is, in particular, one of the machines mentioned below, specifically a motor, a generator, an AC machine, a three-phase machine, a hydraulic machine, pneumatic machine etc. However, the machine 10 does not have to be a rotating machine, but rather, as an alternative, can be a linear machine in which a rotor moves linearly over a stator.

Figure 2:
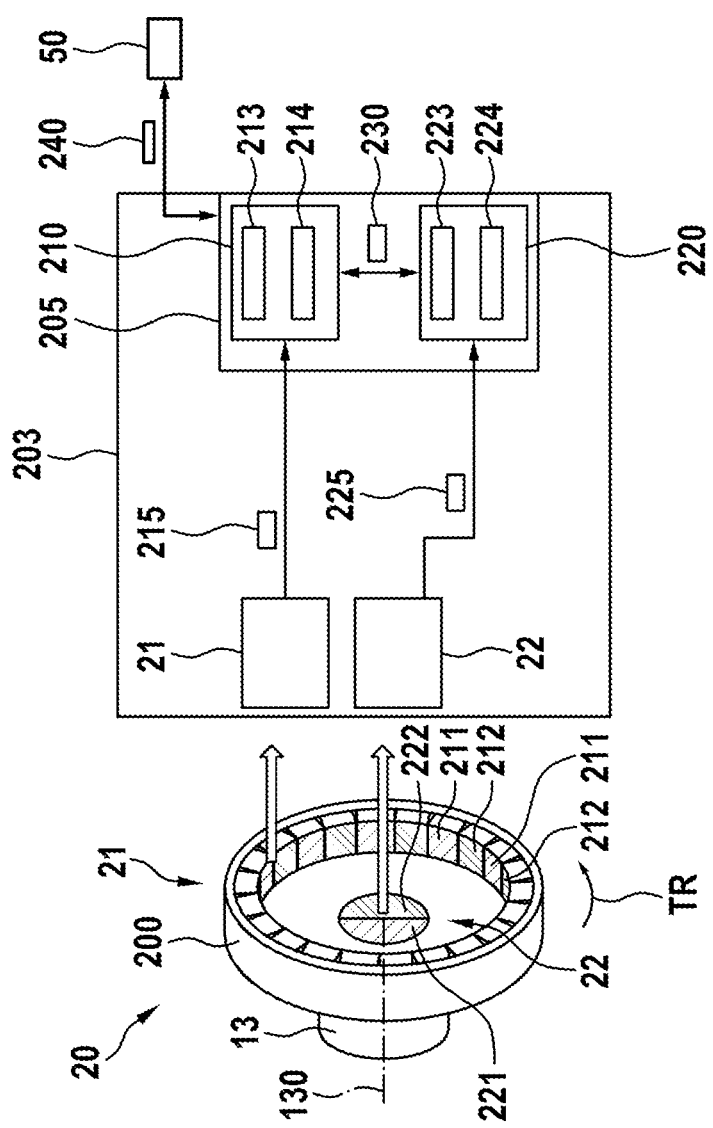
FIG. 2 shows a three-dimensional view of the position detection system, together with its electrical design in a block diagram according to the first exemplary embodiment.

FIG. 2 shows the design of the position detection system 20 according to a specific example more precisely. Here, the mechanical design of the position detection system 20 is shown on the left-hand side of FIG. 2. The position detection system 20 has the pole wheel 200 which is arranged on the shaft 13.

The shaft 13 can be rotated about a rotation axis 130. In the example of FIG. 2, the rotation axis 130 of the shaft 13 is the same as the rotation axis of the pole wheel 200. An arrangement of this kind is optimized in respect of the lowest space requirement. If more space is available or required by the application, the movement of the rotation axis 130 can alternatively be tapped off from another shaft which is not shown here and is coupled to the rotation axis 130, in particular by means of a gear mechanism.

The right-hand side of FIG. 2 illustrates the electrical design of the electronics assembly 203 in a schematic block diagram. In addition to the first position sensor 21 and the second position sensor 22, the position detection system 20 has, in the electronics assembly 203, an evaluation device 205 comprising a first and a second control unit 210, 220.

The first position sensor 21 is configured as an incremental sensor with a large number of magnets 211, 212 with first magnet poles 211 and second magnet poles 212, which first and second magnet poles repel one another or have a different polarity. The magnets 211, 212 of the first position sensor 21, more precisely the first and second magnet poles 211, 212 of said magnets, are arranged in an alternating manner along the periphery of the pole wheel 200 on an inner wall of the pole wheel 200 in FIG. 2. However, as an alternative, it is possible to arrange the first and second magnet poles 211, 212 in an alternating manner along the periphery of the pole wheel 200 on an outer wall of the pole wheel 200. For reasons of clarity, not all magnet poles 211, 212 are provided with a reference symbol in FIG. 2. In the present exemplary embodiment, the first position sensor 21 is an angle sensor.

The number of pairs of first and second magnet poles 211, 212 of the first position sensor 21 determines the resolution with which the detection of the position of the shaft 13 is possible in the event of its rotation about the rotation axis 130. 11 pairs of first and second magnet poles 211, 212 are provided in the present example. The greater the number of pairs of first and second magnet poles 211, 212, the greater the resolution of the detection. In addition, the greater the number of pairs of first and second magnet poles 211, 212, the higher the achievable quality, in other words the better an incremental position evaluation can be carried out by way of the first control unit 210. To this end, the first position sensor 21 sends its detection results in the form of a signal 215 to the first control unit 210. The detection results or the signal 215 are/is detected by the first position sensor 21 at a predetermined clock rate or at predetermined time intervals and sent to the first control unit 210.

A magnet 221, 222 of the second position sensor 22 is arranged in the center of the pole wheel 200. The magnet 221, 222 has a first magnet pole 221 and a second magnet pole 222, which first magnet pole and second magnet pole repel one another or have a different polarity. In the example of FIG. 2, the magnet 221, 222 is a round magnet. The magnet 221, 222 of the second position sensor 22 is also arranged in the center of the magnets 211, 212 of the first position sensor 21. The center of the magnet 221, 222 and the center of the shaft 13 is the same in the example of FIG. 2. In the present exemplary embodiment, the second position sensor 22 is an angle sensor. An angle sensor has, for example, two magnetic sensors which are mounted in a chip in a manner offset through approximately 90° C. As an alternative, an angle sensor has two magnetic sensors which are mounted on a printed circuit board in a manner offset through approximately 90° C. However, all other embodiments which can detect an angle are conceivable for an angle sensor.

If necessary for safety reasons, an angular magnet, with which an interlocking connection for mounting the magnet 221, 222 is possible, can be selected instead of a round magnet for the second position sensor 22. The interlocking connection ensures that the magnet 221, 222 cannot come loose from its mounting position. In contrast, a round magnet can more easily come loose from its mounting position. However, since a round magnet is more favorable than an angular magnet, the fault of the round magnet coming loose is detected by the second magnet unit in the present exemplary embodiment, as described even more precisely below.

The second position sensor 22 sends its detection results as a signal 225 to the second control unit 220 via a communication line 227. In this case, the detection results or the signal 225 are/is detected by the second position sensor 22 at a predetermined clock rate or at predetermined time intervals and sent to the second control unit 220.

In the case of a linear machine, a large number of magnets 211, 212 which are lined up with one another in a row along the length of a stator of the linear machine can be used instead of a pole wheel 200. In a situation of this kind, the first and the second position sensor 21, 22 are length detection sensors. Here, as many division periods per unit length as possible are required.

The first control unit 210 is, in particular, a microcontroller with a central processing unit (CPU) 213 and at least one memory unit 214. The second control unit 220 is also, in particular, a microcontroller with a central processing unit (CPU) 223 and at least one memory unit 224.

The evaluation device 205 has the control units 210, 220. The control units 210, 220 are connected to one another, so that data 230 can be transmitted between the control units 210, 220. As a result, each of the control units 210, 220 can use the detection results or signals 215, 225 of both sensors 21, 22 during their evaluation. The evaluation result of the control units 210, 220 can also be transmitted as data 230 between the control units 210, 220, so that each control unit 210, 220 can also access said evaluation result. Additionally, at least one of the control unit 210, 220 can evaluate how many revolutions the shaft 13 has executed in the rotation direction TR or in the counterclockwise direction. The evaluation device 205 can also evaluate how many revolutions the shaft 13 has executed counter to the rotation direction TR or in the clockwise direction. The absolute position of the shaft 13 can likewise be ascertained therefrom. Evaluation results resulting from this comprise a secure position which can be used for fault identification in the position detection. In each case, the evaluation device 205, by way of the control unit 220, forms the absolute position of the shaft 13 on the basis of the detection results of the sensor 22. Fault detection is implemented by comparing the incremental positions formed by the control units 210, 220, so that the secure position can be determined. In this case, fault detection detects some of the possible faults which can have an effect when forming the absolute position of the shaft 13.

In the present exemplary embodiment, the evaluation device 205 is part of the machine 10. As an alternative, at least one of the control units 210, 220 can be provided externally from the machine 10. In addition, the evaluation device 205 is connected to an external apparatus 50 which is, for example, a control center (host). The evaluation device 205 is configured to send the abovementioned evaluation results in the form of data 240 to the external apparatus 50 when the machine 10 is switched on. The evaluation results, and therefore the data 240, comprise the secure position which has been securely formed by the second control unit 220 in the switched-off state of the machine 10.

Therefore, the position detection system 20 firstly provides for detection of the absolute position of the shaft 13 or of the rotor 11 by way of the second position sensor 22 and evaluation of the absolute position of the shaft 13 or of the rotor 11 by way of the second control unit 220. The detection result or the signal 225 of the second position sensor 22 can additionally be used in the control unit 220 in order to identify the direction in which the shaft 13, as an element of the machine 10, is moving. Secondly, the position detection system 20 also provides for incremental position detection by means of the first position sensor 21 and also incremental position evaluation by means of the first control unit 210 which is required for the high-resolution position. The detection result or the signal 215 of the first position sensor 21 can additionally be used in the control unit 210 in order to identify the direction in which the shaft 13, as an element of the machine 10, is moving. Here, the absolute position detection by means of the second position sensor 22 and the high-resolution position detection by means of the first position sensor 21 form an overall system. In the overall system, the absolute position detection and high-resolution position detection are systems which are dependent on one another.

As a result, there is a redundancy which is required for forming a secure incremental position which is detected by way of the first position sensor 21 and by way of the position sensor 22. This redundancy can be used for fault identification in the case of the secure absolute position which is detected by way of the second position sensor 22. Here, the two detection results or signals 215, 225 of the two sensors 21, 22 can be compared with one another by way of a predetermined comparison rule. If the detection results or signals 215, 225 provide results for the position which differ from one another, the evaluation device 205 identifies the position result as a fault. If a fault is identified, the evaluation device 205 can no longer send an absolute position.

Therefore, the external apparatus 50 interprets the lack of appropriate data 240 as a fault. A fault can occur, for example, owing to a magnet 211, 212 or the magnet 221, 222 becoming detached from the pole wheel 200. However, other faults are conceivable.

The advantage of such a construction and configuration of the position detection system 20 is that the components, such as the second position sensor 22 and the control unit 220, are used for forming a secure incremental position of the shaft 13 or of the rotor 11. Since a large number of faults are detected or diagnosed in this mode of operation, single-channel formation of the secure absolute position of the shaft 13 or of the rotor 11 can be achieved by the second position sensor 22 and the second control unit 220 with a high diagnostic coverage rate.

If the redundancy is not required, only the second position sensor 22 and the control unit 220 can be provided. In this case, there is no pole wheel 200 with the first position sensor 21 and no first control unit 210.

As an alternative, it is possible, given the configuration of the position detection system 20, to switch on or switch off the first control unit 210 and/or the first position sensor 21 depending on the redundancy requirement. However, in these said cases, the resolution and the quality of the position ascertained by way of the evaluation device 205 are then lower.

Figure 3:
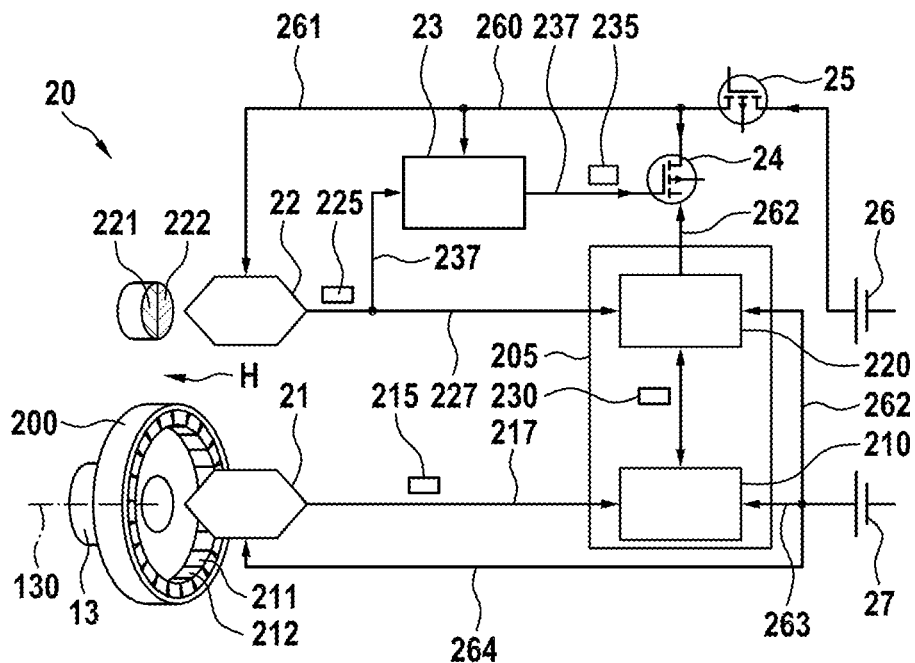
FIG. 3 shows a basic circuit diagram for switching on and switching off the position detection system according to the first exemplary embodiment.

FIG. 3 shows the electrical design of the position detection system 20 more precisely for the situation in which operation-free position detection of the shaft 13 is required. The position detection system 20 has, in addition to the first and the second position sensor 21, 22, an electronic circuit 23, switches 24, 25, a first energy supply device 26, a second energy supply device 27 and the evaluation device 205. The switches 24, 25 are, for example, transistors, in particular metal-oxide semiconductor transistors. The circuit 23 is, for example, a flip-flop circuit, in particular a comparator flip-flop circuit.

The magnet 221, 222 for the second position sensor 22 is actually arranged in the center of the pole wheel 200, as shown in FIG. 2, even though the magnet 221, 222 in FIG. 3 is illustrated separately from the pole wheel 200 for reasons of clarity of the illustration.

In a first mode of operation of the circuit of FIG. 3, the electronic circuit 23 is connected to the first energy supply device 26 via a supply line 260 and the switch 25. In addition, the second position sensor 22 is additionally connected to the energy supply device 26 via a supply line 261. As a result, both the second position sensor 22 and also the electronic circuit 23 can be supplied with electrical energy by the energy supply device 26 when the switch 25 is appropriately switched. In a second mode of operation of the circuit of FIG. 3, the second position sensor 22 is connected to the second energy supply device 27 via the supply lines 260, 261 and the appropriately switched switch 24. Therefore, the second position sensor 22 and the electronic circuit 23 are always supplied with energy by one of the energy supply devices 26, 27.

In contrast, the second control unit 220 has three possible modes of operation in respect of the supply of energy by the energy supply devices 26, 27. In a first mode of operation, the second control unit 220 is switched off by the electronic circuit 23 since the electronic circuit 23 does not identify any rotation by means of the second position sensor 22 and the second energy supply device 27 is switched off. In a second mode of operation, the second control unit 220 is supplied with energy from the first energy supply device 26 since the electronic circuit 23 identifies a rotation by means of the second position sensor 22 and therefore switches on the second control unit 220. In a third mode of operation, the second control unit 220 is connected to the energy supply device 27 via the supply line 262 by means of the switch 24 and is supplied with energy from the first energy supply device 27 in this way since the external apparatus 50 supplies the second energy supply device 27 with energy.

The second energy supply device 27 supplies the control units 210, 220 with electrical energy, in particular a selectable voltage VCC, from an energy supply grid via supply lines 262, 263. In contrast, the first energy supply device 26 is configured as a battery which can likewise supply the control unit 220 with the selectable voltage VCC. The magnitude of the electrical voltage VCC can be selected depending on requirements. The energy supply device 26 can be configured as a non-rechargeable battery or as a rechargeable battery, that is to say accumulator. As an alternative or in addition, the energy supply device 26 is configured at least partially as an energy source which generates energy from the area surrounding the machine 10, this being known as so-called energy harvesting. The energy supply device 26 can use, for example, vibrations, temperature differences, light energy, air flows etc. in the surrounding area for this purpose.

A mode of operation for supplying the control unit 220 from the second energy supply device 27 is when the machine 10 is already completely installed and is being operated in the normal mode. A mode of operation for supplying the control unit 220 from the first energy supply device 26 is when no energy supply network is available or switched on, for example when the machine 10 and the energy supply device 26 are switched off or when the machine 10 is being transported, in particular from the factory to the site of installation of the machine 10, as described above.

Therefore, the functioning of the position detection system 20 is ensured even in the non-operating state of the machine 10 from FIG. 1. Therefore, depending on the mode of operation, the second control unit 220 can be selectively supplied from the first energy supply device 26 or the second energy supply device 27. In contrast, the first control unit 210 and the first position sensor 21 are interconnected in the circuit of FIG. 3 in such a way that the first control unit 210 and the first position sensor 21 can be supplied only from the second energy supply device 27.

In the position detection system 20, the second position sensor 22 executes the function of switching on or switching off the circuit 23, as described below.

If, in the case of the machine of FIG. 1, the rotor 11 or the shaft 13 moves relative to the stator 12, a magnetic field H at the pole wheel 200 changes, said magnetic field being only highly schematically illustrated in FIG. 3 for the sensors 21, 22. The magnetic field H or the change in said magnetic field can be detected by the first and the second position sensor 21, 22. The first and the second position sensor 21, 22 are configured as magnetic field detectors which are, in particular, TMR sensors (TMR=tunnel magnetoresistance).

If the second position sensor 22 detects a magnetic field H or a change in the magnetic field, the second position sensor 22 outputs a detection result in the form of an analog or digital signal 225. The detection result or the signal 225 is transmitted to the electronic circuit 23 and to the second control unit 220. If the detection result is an analog signal 225, the electronic circuit 23 digitizes the analog signal 225. When a magnetic field H or a change in the magnetic field is detected by way of the second position sensor 22, the electronic circuit 23 switches on the energy supply of the second control unit 220, as mentioned above. In the second control unit 220, the detection result or the signal 225 is stored in the memory unit 223 shown in FIG. 2 and can be evaluated, as described above. The second control unit 220 also stores the evaluation result, or the absolute position, in the memory unit 223.

The electronic circuit 23 is configured in such a way that it can receive the detection result in the form of the analog or digital signal 225 and can identify an edge of the digital or digitized analog signal 225. If the electronic circuit 23 identifies an edge of the digital or digitized analog signal 225, the electronic circuit 23 outputs a signal 235 to the switch 24 via a communication line 237. Consequently, the switch 24 switches on the second control unit 220. To this end, the switch 24 connects the first energy supply device 26 to the second control unit 220. The second control unit 220 is switched on in this way. Consequently, the second control unit 220 detects each movement of the shaft 13, as an element of the machine 10, and can evaluate this movement.

In addition, the first control unit 210 and the first position sensor 21 are also directly connected to the second energy supply device 27. In this case, the detection results or the signal 215 of the first position sensor 21 are/is also sent as an analog or digital signal to the first control unit 210 via the communication line 217 and stored in the memory unit 213 shown in FIG. 2, as described above. The first control unit 210 and the first position sensor 21 are not directly involved in forming the absolute position, as described above.

As a result, the absolute position of the shaft 13, as an element of the machine 10, can be detected and evaluated during several revolutions. In addition, movements of the shaft 13 in the clockwise direction or in the counterclockwise direction can be detected and taken into account for evaluating the absolute position of the shaft 13.

If the second control unit 220 is switched on, the second control unit 220 maintains its electrical energy supply via one of the devices 26, 27 until the second position sensor 22 no longer detects a magnetic field H or until the rotational movement to be detected ends or is slow If, however, a magnetic field H or a change in the magnetic field is detected again or the rotational movement continues, the electronic circuit 23 switches on the power supply to the second control unit 220 again, as described above. The edge detection therefore serves to wake up the position detection electronics system, which is implemented by at least the control unit 220, and ensures rotational movement identification with respect to the shaft 13, as an element of the machine 10.

In this way, the position detection system 20 identifies the movement of the element 11, 13 of the machine 10, monitors and counts the revolutions of the shaft 13 and therefore of the rotor 11, as elements 11, 13 of the rotating machine 10. The position detection system 20 then goes to sleep again. Therefore, the position of the elements 11, 13 of the machine 10 is maintained and the installation 1, after being switched off, can be put into operation again without renewed initialization or, in the case of transportation, can be put into operation at the site of installation or at the premises of the user of the machine 10 or of the installation 1.

Figure 4:
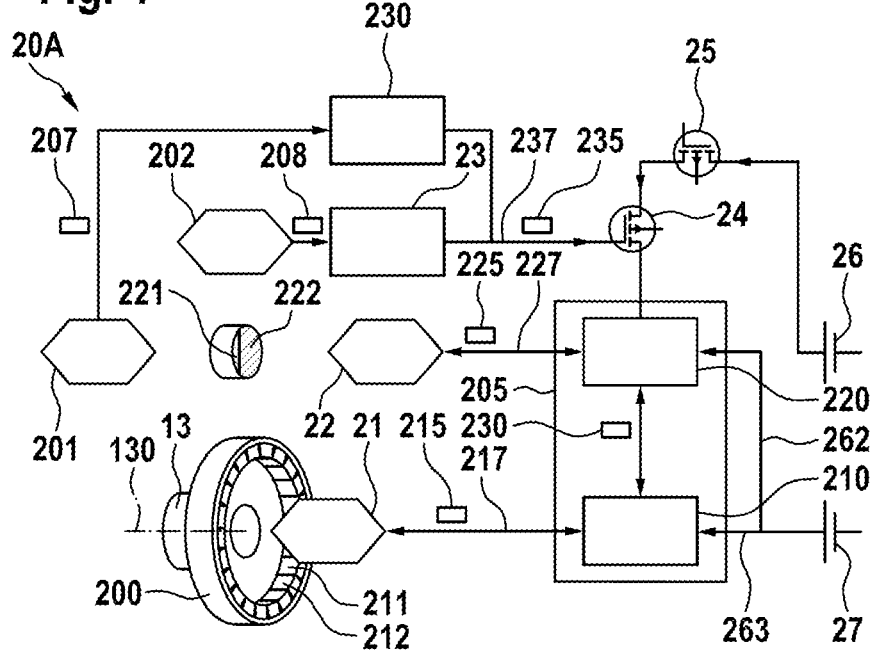
FIG. 4 shows a basic circuit diagram for switching on and switching off a position detection system according to a second exemplary embodiment.

FIG. 4 shows the electrical design of a position detection system 20A according to a second exemplary embodiment more precisely. Operation-free position detection of the shaft 13 is also possible by way of the position detection system 20A if required. The position detection system 20A is largely constructed in the same way as the manner described with respect to the position detection system 20 of the previous exemplary embodiment.

In contrast to the position detection system 20 according to the previous exemplary embodiment, at least two Hall sensors 201, 202 are additionally provided in the position detection system 20A, said at least two Hall sensors detecting the change in the magnetic field at the magnet 221, 222 which is arranged in the center of the pole wheel 200. In addition, an additional electronic circuit 230 is provided, which additional electronic circuit can be constructed like the electronic circuit 23.

If the Hall sensor 201 detects a change in the magnetic field at the magnet 221, 222, the Hall sensor 201 sends an analog or digital signal 207 to the electronic circuit 230. If the Hall sensor 202 detects a change in the magnetic field at the magnet 221, 222, the Hall sensor 201 sends an analog or digital signal 208 to the electronic circuit 23. If at least one of the electronic circuits 23, 230 detects an edge of the digitized analog signal or of the digital signal, the corresponding electronic circuit 23, 230 outputs the signal 235 to the switch 24, so that the switch 24 switches on the second control unit 220, as described above with respect to FIG. 3. If the second position sensor 22 then detects a change in the magnetic field at the magnet 221, 222, the second position sensor 22 sends its detection result or the signal 225 to the second control unit 220. Even if the first control unit 210 and the first position sensor 21 are not involved in forming the absolute position, the first control unit 210 and the first position sensor 21 can optionally also be supplied from the second energy supply device 27. In this case, the detection results or the signal 215 of the first position sensor 21 are/is also treated and sent as an analog or digital signal to the first control unit 210 via the communication line 217, as described above.

The second control unit 220 is switched off when a change in the magnetic field at the magnet 221, 222 is no longer detected by the Hall sensors 201, 202, as described above with respect to FIG. 3 for the second control unit 220.

The processes of waking up and putting to sleep the position detection electronics system can also be implemented in this way. Therefore, rotational movement identification with respect to the shaft 13, as an element of the machine 10, is also ensured by way of the circuit of FIG. 4.

Figure 5:
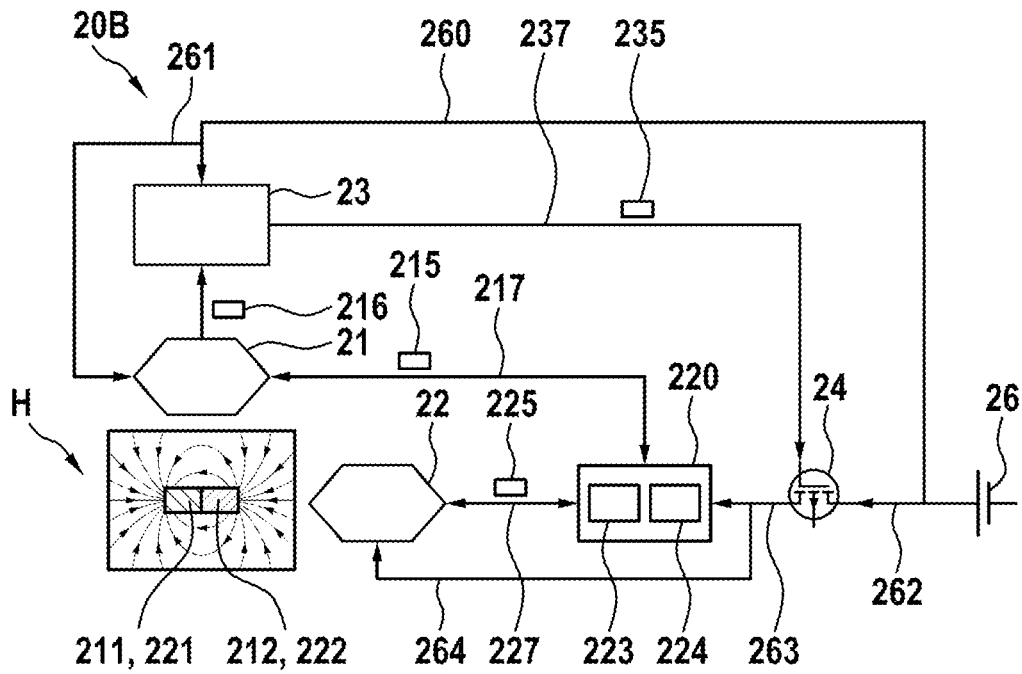
FIG. 5 shows a basic circuit diagram for switching on and switching off a position detection system according to a third exemplary embodiment.

FIG. 5 shows the electrical design of a position detection system 20B according to a third exemplary embodiment more precisely. Operation-free position detection of the shaft 13 is also possible by way of the position detection system 20B as required. The position detection system 20B is largely constructed in the same way as the manner described with respect to the position detection system 20 of the first exemplary embodiment.

However, in contrast to the position detection system 20 according to the first exemplary embodiment, only one switch 24 and no control unit 210 is provided in the position detection system 20B. In addition, the first position sensor 21 is provided for outputting a digital signal 216 to the electronic circuit 23.

Therefore, if the first position sensor 21 detects a change in the magnetic field at the magnets 211, 212, the first position sensor 21 sends the analog or digital signal 216 to the electronic circuit 23. If the electronic circuit 23 detects an edge of the digitized analog or digital signal 216, the electronic circuit 23 outputs the signal 235 to the switch 24, so that the switch 24 switches on the second control unit 220, as described above with respect to FIG. 3. The switch 24 is switched off when a change in the magnetic field at the magnet 221, 222 is no longer detected by the first position sensor 21, as described above with respect to FIG. 3 for the circuit 23. As an alternative or in addition, the second control unit 220 can be switched off again, as described in the previous exemplary embodiments.

The processes of waking up and putting to sleep the position detection electronics system can also be implemented in this way. Therefore, rotational movement identification with respect to the shaft 13, as an element of the machine 10, is also ensured by way of the circuit of FIG. 5. However, since only the second control unit 220 and not the first control unit 210 is provided, the position detection system 20B provides a lower security level than the position detection systems 20, 20A of the previous exemplary embodiments.

Figure 6:
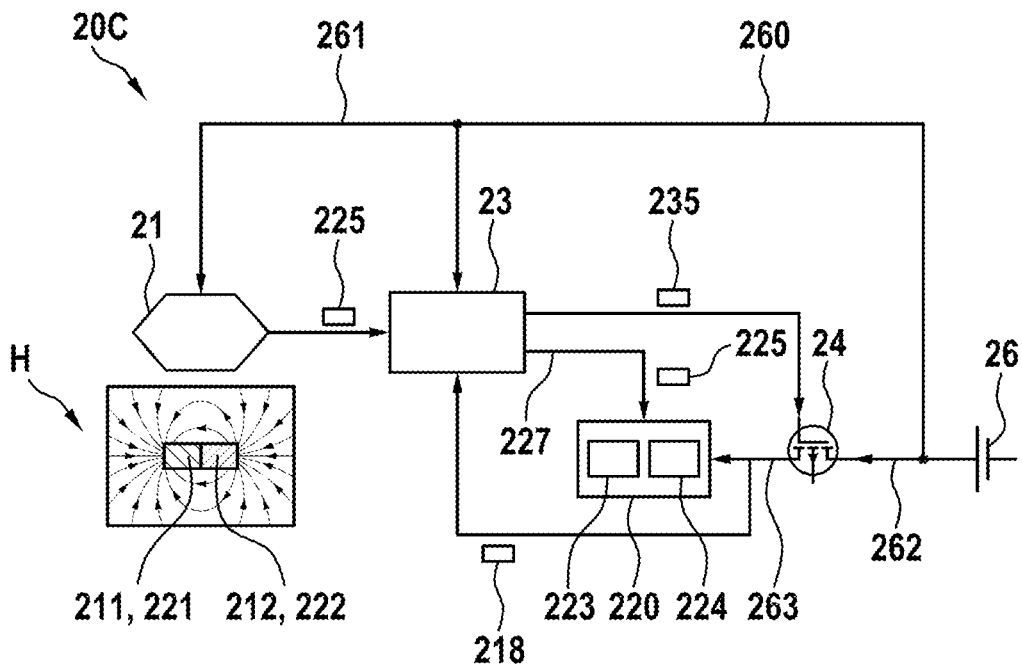
FIG. 6 shows a basic circuit diagram for switching on and switching off a position detection system according to a fourth exemplary embodiment.

FIG. 6 shows the electrical design of a position detection system 20C according to a fourth exemplary embodiment more precisely. Operation-free position detection of the shaft 13 is also possible by way of the position detection system 20C as required. The position detection system 20B is largely constructed in the same way as the manner described with respect to the position detection system 20B of the previous exemplary embodiment.

However, in contrast to the position detection system 20B according to the previous exemplary embodiment, only one of the position sensors 21, 22, for example the position sensor 21, is provided in the position detection system 20C. In addition, the electronic circuit 23 initially receives the detection results of this one sensor 21, that is to say of the first position sensor 21 in the example of FIG. 6, and, on the basis thereof, forms the digital signal 235 for switching on or switching off the switch 24. The electronic circuit 23 can additionally use a digital signal 218, which is output by the second control unit 220, for this purpose.

The processes of waking up and putting to sleep the position detection electronics system can also be implemented in this way. Therefore, rotational movement identification with respect to the shaft 13, as an element of the machine 10, is also ensured by way of the circuit of FIG. 6. However, since only the second control unit 220 and not the first control unit 210 is provided, the position detection system 20B provides a lower security level than the position detection systems 20, 20A of the previous exemplary embodiments.

According to a fifth exemplary embodiment, the energy supply device 26 is not a part of the position detection system 20 or of the position detection system 20A. Instead, the energy supply device 26 is external from the position detection system 20 or the position detection system 20. For example, the energy supply device 26 is an emergency power supply device of the installation 1.

All of the above-described refinements of the installation 1, of the position detection system 20, 20A to 20C and of the method executed by said position detection system can be used individually or in all possible combinations. In particular, all features and/or functions of the above-described exemplary embodiments can be combined in any desired manner. In addition, the following modifications in particular are conceivable.

The parts illustrated in the figures are schematically illustrated and the precise configuration thereof can differ from the forms shown in the figures, provided that the above-described functions thereof are ensured.

At least one of the communication lines 217, 227, 237 is possibly configured as a serial bus, in particular as an $I^2C$ bus. In addition, the communication line for the digital signal 218 of FIG. 6 can be configured as a serial bus, in particular as an $I^2C$ bus.

In addition or as an alternative, the first position sensor 21 and/or the sensors 201, 202 can be a parameterizable Hall sensor. As a result, the first position sensor 21 and/or the sensors 201, 202 can be adapted to an extremely wide variety of applications. For example, the sensors 21, 201, 202 can be adapted to different magnets and/or to an increase in the maximum permissible rotation speed or movement speed of the machine 10.

What is claimed is:

1. A position detection system for detecting a movement of a machine, the position detection system comprising:
   a first position sensor configured to detect a first magnetic field that forms at a plurality of magnet pole pairs that are arranged in a row, magnet poles in the plurality of magnet pole pairs of different polarity being arranged next to one another in each case;
   a second position sensor configured to detect a second magnetic field at an individual magnet that is arranged in a center of the plurality of magnet pole pairs and is arranged at a distance from each magnet pole in the plurality of magnet pole pairs;
   an evaluation device configured to evaluate at least one detection result of the first position sensor and at least one detection result of the second position sensor that have been detected based on a movement of an element of the machine relative to the first position sensor and the second position sensor, the evaluation including identifying a fault based on the at least one detection result of the first position sensor and the at least one detection result of the second position sensor;
   an electronic circuit; and
   at least one switch,
   wherein the electronic circuit is configured to output a first signal configured to actuate the at least one switch in response to a reception of a second signal from one of the first position sensor and second position sensor indicating that a change in one of the first magnetic field and the second magnetic field has been detected, and
   wherein the at least one switch is configured to one of switch on and switch off the detection of the other one of the first magnetic field and the second magnetic field by the other one of the first position sensor and second position sensor in response to the second signal being output by the electronic circuit.

2. The position detection system according to claim 1, wherein at least one of:
   the evaluation device has a first control unit configured to evaluate the at least one detection result of the first position sensor and a second control unit configured to evaluate the at least one detection result of the second position sensor;
   the first position sensor is configured to detect an incremental position in a movement of the element of the machine; and
   the second position sensor is configured to (i) detect an absolute position in a movement of the element of the machine and (ii) identify a direction of the movement of the element of the machine.

3. The position detection system according to claim 1, wherein the evaluation device is configured to evaluate an absolute position in a movement of the element of the machine within a plurality of revolutions of the element of the machine.

4. The position detection system according to claim 1 further comprising:
   an energy supply device configured to supply the second position sensor, the electronic circuit, the at least one switch, and the second control unit with electrical energy.

5. The position detection system according to claim 1, wherein one of:
   the first position sensor and the second position sensor are tunnel magnetoresistance sensors; and
   the first position sensor is a tunnel magnetoresistance sensor and the second position sensor is a Hall sensor.

6. The position detection system according to claim 1, wherein the electronic circuit has a flip-flop circuit.

7. An installation comprising:
   a machine having at least one movable element configured to be driven to perform a movement by the machine; and
   at least one position detection system configured to detect a movement of the at least one movable element of the machine, the at least one position detection system comprising:
      a first position sensor configured to detect a first magnetic field that forms at a plurality of magnet pole pairs that are arranged in a row, magnet poles in the plurality of magnet pole pairs of different polarity being arranged next to one another in each case;
      a second position sensor configured to detect a second magnetic field at an individual magnet that is arranged in a center of the plurality of magnet pole pairs and is arranged at a distance from each magnet pole in the plurality of magnet pole pairs;
      an evaluation device configured to evaluate at least one detection result of the first position sensor and at least one detection result of the second position sensor that have been detected based on the movement of the at least one movable element of the machine relative to the first position sensor and the second position sensor, the evaluation including identifying a fault based on the at least one detection result of the first position sensor and the at least one detection result of the second position sensor;
      an electronic circuit; and
      at least one switch,
   wherein the electronic circuit is configured to output a first signal configured to actuate the at least one switch in response to a reception of a second signal from one of the first position sensor and second position sensor indicating that a change in one of the first magnetic field and the second magnetic field has been detected, and
   wherein the at least one switch is configured to one of switch on and switch off the detection of the other one of the first magnetic field and the second magnetic field by the other one of the first position sensor and second position sensor in response to the second signal being output by the electronic circuit.

8. The installation according to claim 7, wherein the at least one movable element of the machine is one of a rotor and a shaft of the machine.

9. The installation according to claim 7 further comprising:
   at least one installation element configured to be driven by the machine, the machine being configured to drive the at least one installation element to perform one of a rotational movement and a linear movement.

10. The installation according to claim 7, wherein the at least one position detection system is configured to detect the movement of the at least one movable element of the machine in a non-operating state of the machine.

11. A method for detecting a movement of a machine with a position detection system including a first position sensor, a second position sensor, and an evaluation device, the method comprising:
- detecting, with the first position sensor, a first magnetic field that forms at a plurality of magnet pole pairs that are arranged in a row, magnet poles in the plurality of magnet pole pairs of different polarity being arranged next to one another in each case,
- detecting, with the second position sensor, a second magnetic field at an individual magnet that is arranged in a center of the plurality of magnet pole pairs and is arranged at a distance from each magnet pole in the plurality of magnet pole pairs,
- evaluating with the evaluation device, at least one detection result of the first position sensor and at least one detection result of the second position sensor that have been detected based on a movement of an element of the machine relative to the first position sensor and the second position sensor, the evaluating including identifying a fault based on the at least one detection result of the first position sensor and the at least one detection result of the second position sensor,
- outputting from an electronic circuit a first signal configured to actuate at least one switch in response to a reception of a second signal from one of the first position sensor and second position sensor indicating that a change in one of the first magnetic field and the second magnetic field has been detected, and
- wherein the at least one switch is configured to one of switch on and switch off the detection of the other one of the first magnetic field and the second magnetic field by the other one of the first position sensor and second position sensor in response to the second signal being output by the electronic circuit.

* * * * *